(12) United States Patent
Janani et al.

(10) Patent No.: US 9,059,750 B2
(45) Date of Patent: Jun. 16, 2015

(54) FULL SPATIAL DIMENSION EXTRACTION FOR IMPLICIT BEAMFORMING

(75) Inventors: Mohammad Janani, Plano, TX (US); Ahmadreza Hedayat, Allen, TX (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 13/298,857

(22) Filed: Nov. 17, 2011

(65) Prior Publication Data

US 2013/0128935 A1 May 23, 2013

(51) Int. Cl.
*H04L 1/16* (2006.01)
*H04B 7/04* (2006.01)
*H04B 7/06* (2006.01)

(52) U.S. Cl.
CPC ............ *H04B 7/0413* (2013.01); *H04B 7/0617* (2013.01); *H04B 7/0671* (2013.01); *H04B 7/068* (2013.01)

(58) Field of Classification Search
CPC .............. H04L 27/2647; H04L 5/0007; H04L 25/4925; H04B 3/32; H04B 1/40; H04B 3/23
USPC ......... 375/147–149, 219–221, 260, 267, 285, 375/316, 346–350; 455/75
See application file for complete search history.

(56) References Cited

U.S. PATENT DOCUMENTS

| | | | |
|---|---|---|---|
| 7,620,423 B2 | 11/2009 | Jin et al. | |
| 7,697,485 B2 | 4/2010 | Liu et al. | |
| 7,825,856 B2 | 11/2010 | Na et al. | |
| 7,966,043 B2 | 6/2011 | Guo et al. | |
| 7,978,784 B2 | 7/2011 | Zhang et al. | |
| 2006/0270343 A1 | 11/2006 | Cha et al. | |
| 2007/0060073 A1 | 3/2007 | Boer et al. | |
| 2007/0087694 A1 | 4/2007 | Jin et al. | |
| 2007/0135052 A1* | 6/2007 | Park et al. | ..................... 455/63.1 |
| 2007/0165699 A1 | 7/2007 | Dabak et al. | |

(Continued)

OTHER PUBLICATIONS

"Wi-Fi Certified™ 802.11n Draft 2.0: Longer-Range, Faster Throughput, Multimedia-Grade Wi-Fi® Networks", 2007 Wi-Fi Alliance, pp. 1-18.

(Continued)

*Primary Examiner* — Sam K Ahn
*Assistant Examiner* — Janice Tieu
(74) *Attorney, Agent, or Firm* — Edell, Shapiro & Finnan LLC

(57) ABSTRACT

Techniques are provided to compute downlink beamforming weights for beamforming multiple spatial streams to a wireless device when that wireless device does not transmit with a maximum number of spatial streams, and thus when the full dimensional knowledge of the wireless channel to that wireless device needs to be implicitly derived. Uplink signals are received at a plurality of antennas of a first wireless device that are transmitted via a plurality of antennas of a second wireless device. The first wireless device derives values at a plurality of subcarriers of the received signals across the plurality of antennas of the first wireless device. Downlink beamforming weights are computed from values of consecutive subcarriers across the plurality of antennas of the first wireless device. The first wireless device applies the downlink beamforming weights at respective subcarriers to a number of spatial streams to be transmitted to the second wireless device.

24 Claims, 5 Drawing Sheets

(56) References Cited

U.S. PATENT DOCUMENTS

| | | | |
|---|---|---|---|
| 2007/0258541 A1* | 11/2007 | Yamaura | 375/267 |
| 2007/0286303 A1 | 12/2007 | Yamaura | |
| 2007/0298742 A1 | 12/2007 | Ketchum et al. | |
| 2008/0051145 A1 | 2/2008 | Jin | |
| 2008/0075037 A1 | 3/2008 | Guo et al. | |
| 2008/0139248 A1 | 6/2008 | Liu et al. | |
| 2008/0165728 A1 | 7/2008 | Liu et al. | |
| 2008/0205539 A1 | 8/2008 | Wang et al. | |
| 2009/0042618 A1 | 2/2009 | Hedayat et al. | |
| 2009/0051594 A1* | 2/2009 | Na et al. | 342/373 |
| 2009/0080543 A1* | 3/2009 | Azizi et al. | 375/260 |
| 2009/0098838 A1 | 4/2009 | Guo et al. | |
| 2009/0103497 A1 | 4/2009 | Fernandez-Corbaton et al. | |
| 2009/0116569 A1 | 5/2009 | Jin | |
| 2010/0104038 A1 | 4/2010 | Stager et al. | |
| 2011/0019759 A1* | 1/2011 | Stager et al. | 375/267 |
| 2011/0051636 A1 | 3/2011 | Van Nee et al. | |
| 2011/0201282 A1* | 8/2011 | Van Nee et al. | 455/75 |
| 2011/0268215 A1 | 11/2011 | Khojastepour | |
| 2012/0328033 A1 | 12/2012 | Jin et al. | |

OTHER PUBLICATIONS

"802.11n: The Standard Revealed", 2009 Cisco Systems Inc., pp. 1-23.

* cited by examiner

FULL SPATIAL DIMENSION EXTRACTION FOR IMPLICIT BEAMFORMING

TECHNICAL FIELD

The present disclosure relates to multiple-input multiple-output (MIMO) wireless communication systems.

BACKGROUND

In MIMO wireless communication systems, multiple spatial streams are simultaneously transmitted via multiple antennas of a first wireless device to a second wireless device. When applying beamforming weights to the signals that form the multiple spatial streams to be transmitted, knowledge of the channel information with respect to all of the antennas of the second wireless device is needed for accurate computation of the beamforming weights.

One technique is to implicitly estimate beamforming weights from received signals. Another technique is to use a dedicated and separate training transmission sequence. Implicitly determining beamforming weights is advantageous because it does not increase overhead and latency, and has minimal negative impact on channel coherency.

In order to implicitly determine downlink beamforming weights, it is necessary to receive as many uplink spatial streams as will be transmitted in the downlink to that destination device. There are various occasions in which a destination device may not use its' full uplink spatial capability, e.g., when using cyclic shift diversity, making it more difficult to extract the full dimensional spatial information needed.

DESCRIPTION OF EXAMPLE EMBODIMENTS

Overview

Techniques are provided to compute downlink beamforming weights for beamforming multiple spatial streams to a wireless device when that wireless device does not transmit with a maximum number of spatial streams, and thus when the full dimensional knowledge of the wireless channel to that wireless device needs to be implicitly derived. Uplink signals are received at a plurality of antennas of a first wireless device that are transmitted via a plurality of antennas of a second wireless device. The first wireless device derives values at a plurality of subcarriers of the received signals across the plurality of antennas of the first wireless device. Downlink beamforming weights are computed from values of consecutive subcarriers across the plurality of antennas of the first wireless device. The first wireless device applies the downlink beamforming weights at respective subcarriers to a number of spatial streams in a downlink transmission to be transmitted to the second wireless device.

Example Embodiments

Figure 1:
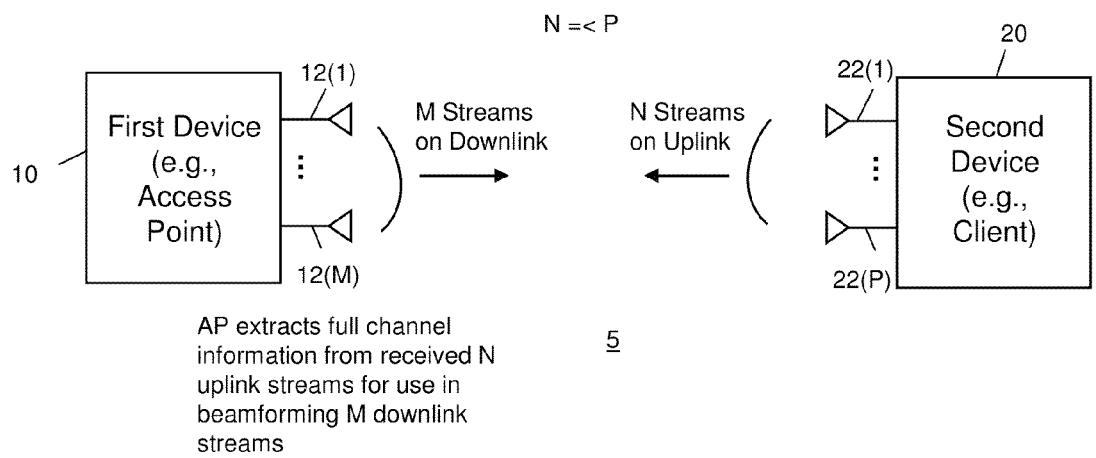
FIG. 1 is a block diagram depicting an example of a MIMO wireless communication system in which a first wireless device is configured to extract full MIMO wireless channel information from received uplink streams transmitted by a second wireless device.

Referring first to FIG. 1, a wireless communication system is shown generally at reference numeral 5. The system 5 comprises a first wireless communication device, e.g., an access point (AP) 10, and at least one second wireless communication devices, e.g., a client device or mobile station (STA) 20. In practical deployments, the AP 10 serves a plurality of client devices but for simplicity only a single client is shown in FIG. 1. The AP 10 comprises a plurality of antennas 12(1)-12(M), and the client device comprises a plurality of antennas 22(1)-22(P). The AP 10 may connect to other wired data network facilities (not shown) and in that sense serves as a gateway or access point through which client device 20 has access to those data network facilities.

The AP 10 may wirelessly communicate with the client device 20 using a wireless communication protocol. An example of such a wireless communication protocol is the IEEE 802.11n communication standard, known commercially as the WiFi™ communication protocol. Another example of a suitable wireless communication protocol is the WiMAX™ communication protocol. The IEEE 802.11n standard, for example, employs multiple-input multiple-output (MIMO) wireless communication techniques in which the AP 10, for downlink transmissions to the client device 10, transmits M spatial streams simultaneously via the M plurality of antennas 12(1)-12(M) using beamforming weights applied to the signal streams across the plurality of antennas. Similarly, for uplink transmissions to the AP 10, the client device 20 may transmit N spatial streams simultaneously via its P plurality of antennas 22(1)-22(P). It is more common for the AP 10 to send multiple spatial streams to the client device 20 to improve the throughput to the client device.

In order to transmit multiple spatial streams to the client device, the AP 10 needs to determine the proper downlink beamforming weights for weighting the spatial streams across the plurality of antennas 12(1)-12(M). The AP 10 derives information about the wireless channel between its antennas 12(1)-12(M) and the antennas 22(1)-22(P) of the client device based on uplink transmissions received from the client device 20.

To directly derive sufficient channel information to transmit M spatial streams using MIMO techniques, the client needs to send the same number of spatial streams to the AP that the AP uses for downlink transmissions to the client. This is not always the case for several reasons. The client device may not be able to support as many spatial streams on the uplink as the AP can support on the downlink. Even if the client has the ability to support the same number of uplink streams as the number of downlink streams, at any given period of time, the client may select to transmit less streams in the uplink for various reasons (lack of uplink data to send, reduced transmit power, poor channel conditions, etc.). When this occurs, the AP 10 cannot directly obtain the channel information it needs to compute the beamforming weights for downlink transmissions of M spatial streams (more than the number of uplink spatial streams).

Accordingly, techniques are provided to enable the AP to extract the full dimensional channel information needed for beamforming M downlink data streams when the AP receives less than M uplink streams from the client. This scheme will allow the AP to derive sufficient information for downlink beamforming transmission of a plurality of spatial streams when any number, N, of streams is sent on the uplink. The AP extracts full channel information from received N uplink streams for use in beamforming M downlink streams.

For example, even when the client device sends one uplink spatial stream, the full spatial information can be derived from the received uplink transmission when the client uses all of its antennas for sending the one uplink spatial stream, for example, when the client device employs a spatial expansion matrix.

Figure 2:
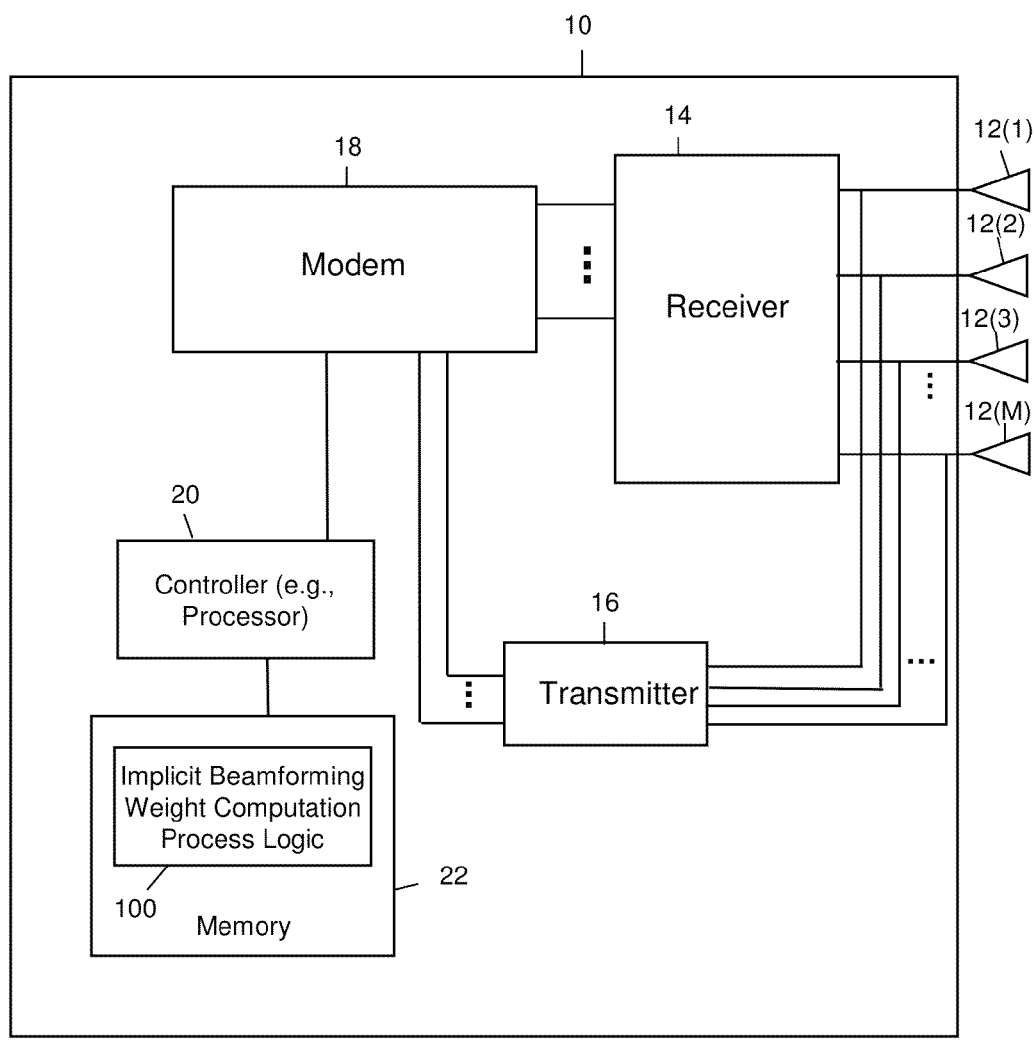
FIG. 2 is a block diagram showing an example of the first wireless device, e.g., a wireless access point device, configured to extract full MIMO wireless channel information from received uplink streams from the second wireless device.

Reference is now made to FIG. 2 that shows an example of a block diagram of AP 10 that is configured to perform the implicit beamforming weight derivation techniques for downlink transmissions of multiple spatial streams. As shown in FIG. 2, the AP 10 comprises a radio receiver 14, a radio transmitter 16, a modem 18, a controller 20 and a memory 22. The radio receiver 14 downconverts signals detected by the plurality of antennas 12(1)-12(M) and supplies antenna-specific receive signals to the modem 18. The receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. Similarly, the transmitter 16 upconverts antenna-specific baseband transmit signals (weighted from application of beamforming weights) to corresponding ones of the plurality of antennas 12(1)-12(M) for transmission. Likewise, the transmitter 16 may comprise individual transmitter circuits that supply respective upconverted signals to corresponding ones of a plurality of antennas 12(1)-12(M) for transmission. For simplicity, these individual transmitter circuits are not shown in FIG. 2.

The controller 20 supplies data to the modem 18 to be transmitted and processes data recovered by the modem 18 from received signals. In addition, the controller 18 performs other transmit and receive control functionality. It should be understood that there are analog-to-digital converters (ADCs) and digital-to-analog converters (DACs) in the various signal paths to convert between analog and digital signals.

The memory 22 stores data used for the techniques described herein. The memory 22 may be separate or part of the controller 20. In addition, instructions for implicit beamforming weight computation process logic 100 may be stored in the memory 22 for execution by the controller 20. The controller 20 supplies the beamforming weights to the modem 18 and the modem 18 applies the beamforming weights signal streams to be transmitted to produce a plurality of weighted antenna-specific transmit signals that are upconverted by the transmitter 16 for transmission by corresponding ones of the plurality of antennas 12(1)-12(M).

The memory 22 is a memory device that may comprise read only memory (ROM), random access memory (RAM), magnetic disk storage media devices, optical storage media devices, flash memory devices, electrical, optical, or other physical/tangible (non-transitory) memory storage devices. The controller 20 is, for example, a microprocessor or microcontroller that executes instructions for the process logic 100 stored in memory 22. Thus, in general, the memory 22 may comprise one or more computer readable storage media (e.g., a memory device) encoded with software comprising computer executable instructions and when the software is executed (by the controller 20) it is operable to perform the operations described herein in connection with process logic 100.

The functions of the controller 20 may be implemented by logic encoded in one or more tangible media (e.g., embedded logic such as an application specific integrated circuit, digital signal processor instructions, software that is executed by a processor, etc.), wherein the memory 22 stores data used for the computations described herein (and/or to store software or processor instructions that are executed to carry out the computations described herein). Thus, the process logic 100 may be implemented with fixed logic or programmable logic (e.g., software/computer instructions executed by a processor) and the controller 22 may be a programmable processor, programmable digital logic (e.g., field programmable gate array) or an application specific integrated circuit (ASIC) that comprises fixed digital logic, or a combination thereof. Some or all of the controller functions described herein, such as those in connection with the process logic 100, may be implemented in the modem 18.

Figure 3:
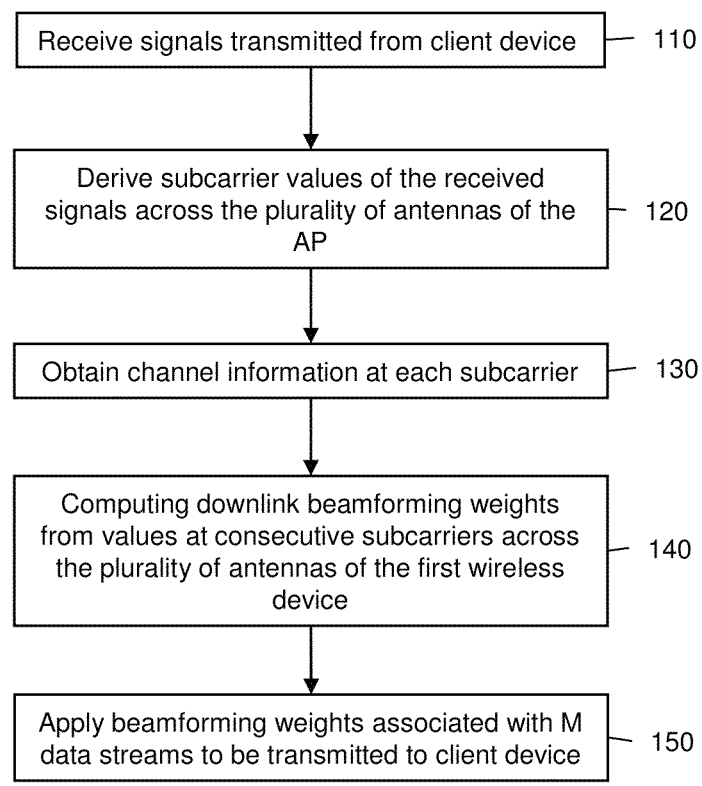
FIG. 3 is a flow chart illustrating in more detail examples of operations performed to compute the downlink beamforming weights.

Reference is now made to FIG. 3 for a general description of the implicit downlink beamforming derivation techniques. Channel estimates (channel state information) from received Orthogonal Frequency Division Multiplexed (OFDM) symbols of the received uplink signals are used to derive the downlink beamforming weights. At 110, signals in an uplink transmission from P plurality of antennas of the client device are received at the M plurality of antennas of the AP. The uplink signals received at 110 may comprise signals for a number of spatial streams less than a number of antennas at the client device (and thus less than the number of spatial streams that the AP could send to the client device).

At 120, values at a plurality of subcarriers of the received signals across the plurality of antennas of the first wireless device are derived from the received signals. At 130, the channel information at each subcarrier (across the M plurality of antennas) is obtained using any of a variety of direct, extrapolation and interpolation techniques known in the art.

At 140, downlink beamforming weights are computed from values of consecutive subcarriers across the plurality of antennas of the AP. Examples of techniques useful for the computations made at 140 are described hereinafter in connection with FIGS. 4 and 5.

At 150, the downlink beamforming weights are applied to a number of spatial streams in a downlink transmission to be transmitted to the client device.

Figure 4:
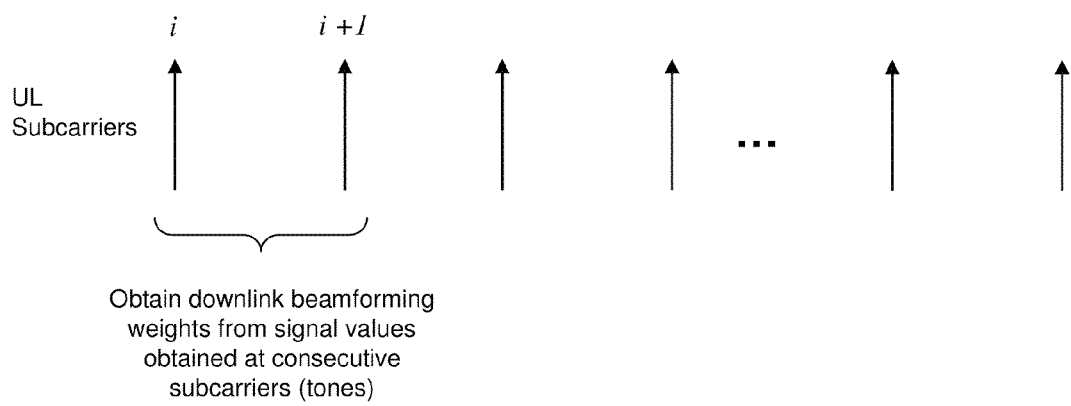
FIG. 4 is a diagram depicting operations to compute downlink beamforming weights from two consecutive subcarriers.

Reference is now made to FIG. 4 for a description of a first technique for computing the downlink beamforming weights from values at two consecutive subcarriers of a receive signal across the antennas of the AP. According to this technique, the downlink beamforming weights are determined based on the values at two consecutive subcarriers of the uplink signals received at the plurality of antennas of the AP. The vector quantity $r_i$ denotes the value of a receive signal at tone i across the plurality of antennas of the AP. Thus, the dimension of vector $r_i$ is equal to M (the number of antennas of the AP). The vector quantity $r_{i+1}$ denotes a vector for a tone that is consecutively adjacent to tone i.

The received signals for any two consecutive tones (in the case of single stream transmission) using cyclic shift diversity (CSD) are: $r_i=(h_1+h_2)s_i$ and $r_{i+1}=(h_1+\alpha h_2)s_{i+1}$, where $r_i$ is the received column vector (size M) at tone i to all receive antennas, $h_i$ is a column channel vector with respect to the transmit antenna i of the client device ($h_i$ has size M), $\alpha$ is the CSD rotation and $s_i$ and $s_{i+1}$ are the transmitted values at subcarriers i and i+1 respectively.

The following is defined:

$v_1$ and $\lambda_1$ are respectively an eigenvector and an eigenvalue of $Cov_i$ and $v_2$ and $\lambda_2$ are respectively an eigenvector and an eigenvalue of $Cov_{i+1}$, where Cov is the covariance matrix operation.

The channel vectors $h_1$ and $h_2$ may be derived from the following set of equations:

$$\begin{bmatrix} \sqrt{\lambda_1}\, w_1 = \hat{h}_1 + \hat{h}_2 \\ \sqrt{\lambda_2}\, w_2 = \hat{h}_1 + \alpha \hat{h}_2 \end{bmatrix}$$

where $w_1 = v_1$; $w_2 = v_2 \alpha^{0.5} e^{-j\theta}$, $\theta = \text{angle}(v_1^H v_2)$ and $\hat{h}_1$ and $\hat{h}_2$ are estimated channel vectors. These equations are the linear estimation of the channel vectors via eigenvectors.

An angle with respect to the signals at the two consecutive tones is defined as: $\text{ang\_r} = \text{angle}(r_i'^* r_{i+1})$, wherein ' denotes the conjugate operation and * denotes the multiplication operation. The goal is to obtain a covariance matrix G whose singular value decomposition (SVD) vectors are the sought after downlink beamforming weights $G = (h_1 h_1' + h_2 h_2')$. Estimated channel vectors $\hat{h}_1$ and $\hat{h}_2$ can be computed as $\hat{h}_2 = (w_1 - w_2)/(1 - e^{(j\pi/4)})$ and $\hat{h}_1 = (w_1 - e^{(-j\pi/4)})^* w_2)/(1 - e^{(-j\pi/4)})$. The covariance matrix at each tone is denoted $Cov_i = r_i r_i^H$, $Cov_{i+1} r_{i+1}^H$. The eigenvectors and eigenvalues of the covariance matrices are easy to derive because each covariance matrix is a rank deficient matrix (made by one vector). Specifically, the eigenvector of this matrix can be obtained without a SVD computation. The eigenvector is one normalized column of the respective covariance matrix. Thus, there is no need to calculate all elements of each covariance matrix and its eigenvalue is the norm of the vector.

According to this method, the estimated channel vectors $h_i$ are computed and the beamforming vectors are derived from these vectors using, for example, a Gram-Schmidt orthogonalizing vector. In this way there is no need to calculate matrix G and to perform a SVD process to derive a downlink beamforming weight vector.

Figure 5:
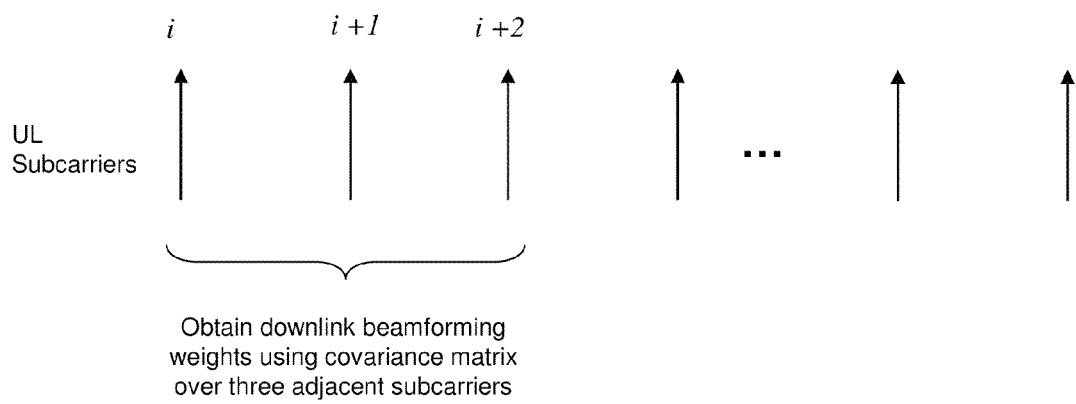
FIG. 5 is a diagram depicting operations to compute downlink beamforming weights from three consecutive subcarriers.

Reference is now made to FIG. 5 for a description of a second technique for computing the downlink beamforming weight vectors from values at three consecutive subcarriers of a received signal across the antennas of the AP. In this technique, a covariance matrix is computed at each of three adjacent subcarriers, and the downlink beamforming weights are computed from the covariance matrix computed at the three adjacent subcarriers. The three subcarriers are arbitrarily denoted i, i+1 and i+2. The received signals for any three consecutive subcarriers are:

$$r_i = (h_1 + h_2) s_i$$

$$r_{i+1} = (h_1 + \alpha h_2) s_{i+1}$$

$$r_{i+2} = (h_1 + \alpha^2 h_2) s_{i+2}$$

The covariance matrix for each subcarrier is computed as:

$$Cov_i = r_i r_i^H = h_1 h_1^H + h_2 h_2^H + h_1 h_2^H + h_2 h_1^H$$

$$Cov_{i+1} = r_{i+1} r_{i+1}^H = h_1 h_1^H + h_2 h_2^H + \alpha^{-1} h_1 h_2^H + \alpha h_2 h_1^H$$

$$Cov_{i+2} = r_{i+2} r_{i+2}^H = h_1 h_1^H + h_2 h_2^H + \alpha^{-2} h_1 h_2^H + \alpha^2 h_2 h_1^H$$

where $h_i$ is, as described above, a column vector from the transmit antenna i of the client device.

These three equations may be rewritten as:

$$Cov_i = G + A + B$$

$$Cov_{i+1} = G + \alpha^{-1} A + \alpha B$$

$$Cov_{i+2} = G + \alpha^{-2} A + \alpha^2 B$$

where $$A = h_1 h_2^H$$

$$B = h_2 h_1^H$$

$$G = h_1 h_1^H + h_2 h_2^H$$

Solving the equations above for G results in $G = Cov_i - \sqrt{2} Cov_{i+1} + Cov_{i+2}$. Thus, the eigenvectors of the matrix G can be derived from the covariance matrices at the respective subcarriers.

Figure 6:
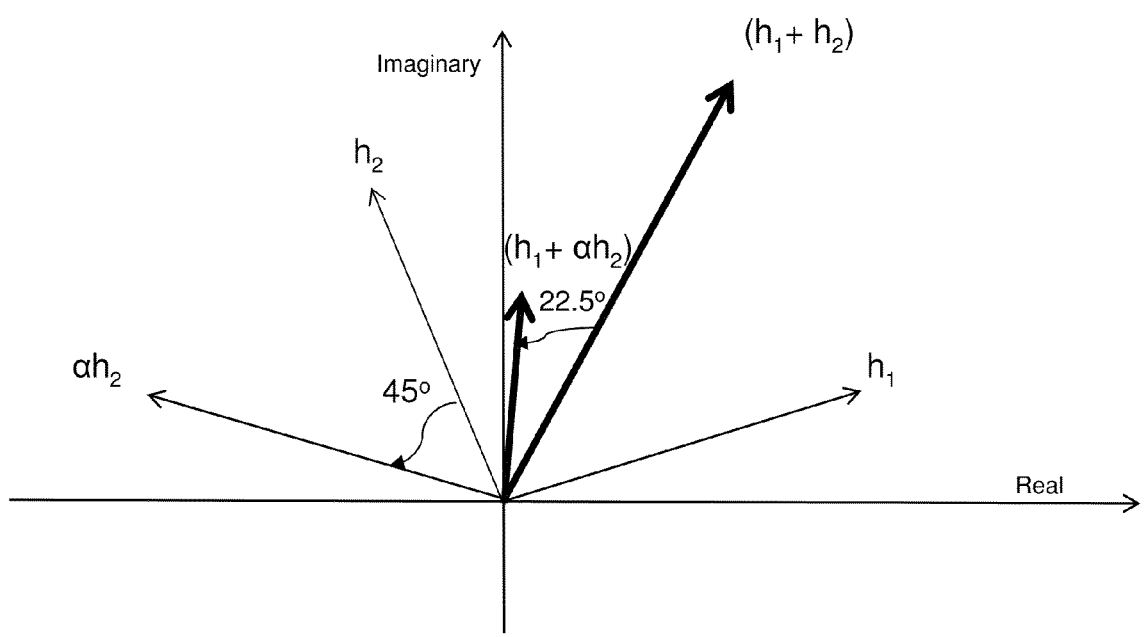
FIG. 6 is a diagram depicting further details associated with the computations of the downlink beamforming weights according to the operations depicted in FIG. 4.

Reference is now made to FIG. 6 for a further description of the underlying derivation of the method depicted by FIG. 4 described above. FIG. 6 shows a complex domain (real-imaginary). By applying SVD on $Cov_i$ a single SVD vector of $h_1 + h_2$ can be obtained. Similarly for $Cov_{i+1}$, $h_1 + \alpha h_2$ is obtained. The channel vectors $h_1$ and $h_2$ can be obtained by solving the set of equations for $h_1$ and $h_2$. However, due to non-uniqueness of SVD vectors, there is a random phase between the SVD of $Cov_i$ and $Cov_{i+1}$. The random phase is not recoverable. Before solving the linear set of equations, $w_2$ is multiplied with a correction phase term $\phi_1$. As shown in FIG. 6, an estimate is applied so that above set of equation can be solved with little effect from the random phase. When rotating $h_2$ by 45°, $h_1 + \alpha h_2$ rotates between 0 to 45 degrees depending on the magnitude of $h_1$ and $h_2$. While this rotation is unknown, on average it is 22.5° or $\pi/8$. Thus, in one embodiment, $\phi_1$ is set equal to 22.5° or $\pi/8$. There are various other correction phase values that may be used as well. The SVD of $Cov_{i+1}$ can be forced to have phase difference of $\pi/8$ with respect to the SVD of $Cov_i$. In general, for any CSD rotation of $\alpha$, the phase correction term is $\text{sqrt}(\alpha)$.

Generalization to any Number of Antennas at Transmitting Device

The techniques described above can be generalized to a CSD scheme employed with any number of antennas. The following describes such a generalization where the transmitting device (client device) uses a CSD scheme with four antennas. This generalization is applicable to 2- and 3-antenna CSD schemes as well.

The notation 1, 2, 3, 4 is used to denote the respective adjacent subcarriers instead of i, i+1, i+2, i+3 for sake of simplicity. The received signals are:

$$r_1 = (h_1 + h_2 + h_3 + h_4) s_1$$

$$r_2 = (h_1 + h_2 e^{j\alpha} + h_3 e^{j\beta} + h_4 e^{j\gamma}) s_2$$

$$r_3 = (h_1 + h_2 e^{j2\alpha} + h_3 e^{j2\beta} + h_4 e^{j2\gamma}) s_3$$

$$r_4 = (h_1 + h_2 e^{j3\alpha} + h_3 e^{j3\beta} + h_4 e^{j3\gamma}) s_4$$

where $\alpha$, $\beta$ and $\gamma$ are the phases associated with CSDs. For $r_1$, $r_2$, $r_3$, and $r_4$, covariance matrices, denoted by $Cov_1$, $Cov_2$, $Cov_3$ and $Cov_4$ are obtained.

The largest eigenvector associated with $Cov_1$ gives a vector representing: $g_1 = h_1 + h_2 + h_3 + h_4$. The largest eigenvector associated with $Cov_1$ gives a vector representing: $g_2 = h_1 + h_2 * e^{j\alpha} + h_3 e^{j\beta} + h_4 e^{j\gamma}$. The largest eigenvector associated with $Cov_3$ gives a vector representing: $g_3 = h_1 + h_2 e^{j2\alpha} + h_3 e^{j2\beta} + h_4 e^{j2\gamma}$. The largest eigenvector associated with the $Cov_4$ gives a vector representing: $g_4 = h_1 + h_2 e^{j3\alpha} + h_3 e^{j3\beta} + h_4 e^{j3\gamma}$.

Having vectors $g_1$, $g_2$, $g_3$ and $g_4$, the resulting linear set of equations can be solved to obtain $h_1$, $h_2$, $h_3$ and $h_4$. However, before solving the linear set of equations, vectors $g_2$, $g_3$ and $g_4$ are multiplied with some correction phase terms. Vectors $g_2$, $g_3$ and $g_4$ are multiplied with correction phase $\phi_1$, $\phi_2$ and $\phi_3$ respectively, which in one embodiment, are:

$$\phi 1 = \exp(-j*\pi*CSD*40^6/128)$$

$$\phi 2 = \exp(-j*2*\pi*CSD*40^6/128)$$

$$\phi 3 = \exp(-j*3*\pi*CSD*40^6/128)$$

There are various other correction phase values that may be used as well.

While the foregoing is described for 4 antennas, when used for 2 and 3 antennas, zero vectors would be computed for non-existing antennas, i.e., for 3 antennas $h_4$ would be a zero vector (or close to zero in magnitude).

CSD Estimation Techniques

As explained above, the downlink beamforming weights may be computed based on a predetermined (fixed) CSD amount to represent CSD performed at the client device (without specific knowledge of the CSD amount used by that client device). The concepts described above in which particular values are used for CSD may be generalized for any CSD value. For example, while IEEE 802.11 specifics CSD values to be used by client devices, it is possible that a client device or chipset vendors may deviate from the recommended values. Accordingly, a technique is now described to estimate the CSD value used by a client device for its transmissions and then to use the estimated CSD in the beamforming derivation techniques presented above in connection with FIGS. 4 and 5. Moreover, these CSD estimation techniques can also be used for other methods that require estimation of CSD before performing their full spatial dimension extraction. These CSD estimation techniques do not require a larger coherence bandwidth.

The CSD performed at a particular client device can be estimated base on values of the received uplink signals across the plurality of antennas of the AP. In this method, the High Throughput-Long Training Field (HT-LTF) portion of the received signal (transmitted in accordance with the IEEE 802.11n wireless communication standard and amendments of the IEEE 802.11 wireless communication standard) is used to estimate CSD. Three consecutive subcarriers of the received HT-LTF signal are denoted:

$$r_1 = (h_1 + h_2)*s_1$$

$$r_2 = (h_1 - \theta * h_2)*s_2$$

$$r_3 = (h_1 + \theta^2 * h_2)*s_3$$

where $s_1$, $s_2$, and $s_3$ are the HT-LTF signals in the three consecutive subcarriers and they are known at the receiver, $r_1$, $r_2$ and $r_3$ are vectors representing the received values at the three consecutive subcarriers across the plurality of antennas and $\theta = e^{j\alpha}$. The channel is assumed to be all white Gaussian noise (AWGN), but this is not shown for simplicity.

A set of three equations and three unknowns ($h_1$, $h_2$, $\theta$) is obtained. Solving these equations for $\theta$ gives the following: $\theta = \text{average}[(r_2*s_2 - r_3*s_3)/(r_1*s_1 - r_2*s_2)]$ where average is over the received signal of all antennas at the AP and over all sets of three consecutive subcarriers. Alternatively, other statistical methods can be used to average over set of receive antennas and all tones. A similar technique can be used to estimate CSD when the transmitting device transmits from three and four-antenna cases.

In summary, the AP receives a training pattern of known values from the client device, and estimates the CSD by computing an average with respect to values of the received signal and the known values of the training pattern of the plurality of antennas at the AP at the consecutive subcarriers.

Further still, techniques may be employed to estimate the number of antennas of the transmitting client device. In other words, an estimation is made as to the maximum number of spatial streams ever used by that client device, or for each candidate number of antennas, the CSD estimation techniques described above are performed and the number of antennas that solves the foregoing equations (perhaps with minimum degrees of freedom) is chosen as the estimate of the number of antennas of that client device.

An example of a procedure to estimate the number of antennas of the transmitting client device is as follows. First, it is assumed that the number of receive antennas at the client device is the same as maximum number of spatial streams that it can support. This can be obtained from messages each client device sends to the AP at the time of association (contained in, for example, the High-Throughput Capabilities Element of the IEEE 802.11n protocol). The AP continues using this assumption as the number of receive antennas at the client device. If the AP determines that beamforming performance to this client device is worse than what it expects, then the AP continues with the following. The AP first assumes that the client has less than four transmit antennas, then the AP uses the foregoing generalized algorithm for up to four antennas. If the estimated channel for one or more antennas has a low magnitude compared to the rest of the antennas, the AP may conclude that the low-magnitude antennas are in fact non-existent antennas (the AP averages the magnitude over several observations). The AP then updates its assumption of the number of the antennas at the client device. The above two steps include almost all practical scenarios (i.e., the client devices which have four or less receiver chains). However, if the AP still determines that the beamforming performance is worse than what it expects, then the client device may have more than four antennas. In this case, the AP continues without downlink beamforming to this client device (when the number of spatial streams contained in the uplink signals cannot be accurately determined/estimated).

In summary, the techniques described herein allow for deriving the full downlink spatial information in an implicit manner even when the uplink information is designed to reveal channel information for a lesser number of spatial streams. This allows the downlink and uplinks to support unequal spatial multiplexing and yet maintain improved capacity. These techniques are useful when the client device sends uplink transmissions using all of its antennas but with a less number of spatial streams that would otherwise directly reveal the full channel information needed for downlink transmissions with a greater number of spatial streams. These techniques are applicable to any multiple spatial stream MIMO communication standard.

The above description is intended by way of example only. Various modifications and structural changes may be made therein without departing from the scope of the concepts described herein and within the scope and range of equivalents of the claims.

What is claimed is:
1. A method comprising:
  receiving uplink signals at a plurality of antennas of a first wireless device that are transmitted via a plurality of antennas of a second wireless device, wherein receiving comprises receiving the uplink signals from the second wireless device that comprise a number of spatial streams less than a number of the plurality of antennas of the second wireless device;

deriving values at a plurality of subcarriers of the received uplink signals across the plurality of antennas of the first wireless device;

receiving a training pattern of known values from the second wireless device;

computing downlink beamforming weights based on values at two or more consecutive subcarriers across the plurality of antennas of the first wireless device by computing a covariance matrix at each of the two or more consecutive subcarriers, wherein computing the downlink beamforming weights comprises deriving full spatial information for a wireless channel between the first wireless device and the second wireless device when the second wireless device uses a spatial expansion matrix to transmit the number of spatial streams less than the number of the plurality of antennas of the second wireless device;

estimating cyclic shift diversity performed at the second wireless device by computing an average with respect to the received uplink signals and the known values of the training pattern over the plurality of antennas of the first wireless device at the consecutive subcarriers, the estimated cyclic shift diversity used in the computing of the downlink beamforming weights; and applying the downlink beamforming weights at respective subcarriers to the number of spatial streams in a downlink transmission to be transmitted to the second wireless device.

2. The method of claim 1, wherein computing comprises computing the downlink beamforming weights at two consecutive subcarriers based on the values at the two consecutive subcarriers of the uplink signals received at the plurality of antennas of the first wireless device.

3. The method of claim 1, wherein computing the downlink beamforming weights comprises computing a covariance matrix at each of three adjacent subcarriers, and computing the downlink beamforming weights from the covariance matrices computed at the three adjacent subcarriers.

4. The method of claim 1, wherein computing the downlink beamforming weights comprises computing a covariance matrix at each of four adjacent subcarriers associated with received uplink signals transmitted using a cyclic shift diversity scheme with four antennas, and computing the downlink beamforming weights from the covariance matrices computed at the four adjacent subcarriers.

5. The method of claim 1, wherein computing the downlink beamforming weights is based further on a predetermined cyclic shift diversity amount to represent an amount of cyclic shift diversity performed at the second wireless device.

6. The method of claim 1, wherein when the second wireless device has two antennas, receiving the training pattern comprises receiving three consecutive subcarriers of the received training pattern across the plurality of antennas of the first wireless device, and computing a cyclic shift diversity angle $\theta$ from an average$[(r_2{}^*s_2-r_3{}^*s_3)/(r_1{}^*s_1-r_2{}^*s_2)]$, wherein $s_1$, $s_2$ and $s_3$ are known values at three consecutive subcarriers of the training pattern, and $r_1$, $r_2$ and $r_3$ are vectors representing the received values at the three consecutive subcarriers across the plurality of antennas of the first wireless device.

7. The method of claim 6, wherein receiving the training pattern comprises receiving a high-throughput long training field.

8. The method of claim 1, and further comprising sending the downlink transmission without applying the downlink beamforming weights when the number of spatial streams contained in the uplink signals cannot be accurately estimated.

9. An apparatus comprising:

a plurality of antennas of a first wireless device;

a receiver coupled to the plurality of antennas and configured to downconvert uplink signals sent by a second wireless device and detected by the plurality of antennas of the first wireless device, wherein the uplink signals from the second wireless device comprise a number of spatial streams less than a number of the plurality of antennas of the second wireless device, and wherein the receiver is configured to receive a training pattern of known values from the second wireless device;

a modem configured to derive values at a plurality of subcarriers of the received signals across the plurality of antennas and to obtain channel information at the subcarriers;

a processor coupled to the modem and configured to compute downlink beamforming weights based on values at two or more consecutive subcarriers across the plurality of antennas by computing a covariance matrix at each of the two or more consecutive subcarriers, and computing the downlink beamforming weights by deriving full spatial information for a wireless channel between the first wireless device and the second wireless device when the second wireless device uses a spatial expansion matrix to transmit the number of spatial streams less than the number of the plurality of antennas of the second wireless device;

wherein the modem is configured to apply the downlink beamforming weights at respective subcarriers to the number of spatial streams in a downlink transmission to be transmitted to the second wireless device, and wherein the processor is configured to estimate cyclic shift diversity by computing an average with respect to values of the received signal and known values of a received training pattern over the plurality of antennas at the consecutive subcarriers, the estimated cyclic shift diversity used by the processor in the computing of the downlink beamforming weights.

10. The apparatus of claim 9, wherein the processor is configured to compute the downlink beamforming weights at two consecutive subcarriers based on the values at the two consecutive subcarriers of the uplink signals received at the plurality of antennas.

11. The apparatus of claim 9, wherein the processor is configured to compute a covariance matrix at each of three adjacent subcarriers, and compute the downlink beamforming weights from the covariance matrices computed at the three adjacent subcarriers.

12. The apparatus of claim 9, wherein the processor is configured to compute the downlink beamforming weights based further on a predetermined cyclic shift diversity amount to represent any cyclic shift diversity performed at the second wireless device.

13. The apparatus of claim 9, wherein the modem is configured to compute the downlink beamforming weights by computing a covariance matrix at each of four adjacent subcarriers associated with received uplink signals transmitted using a cyclic shift diversity scheme with four antennas, and computing the downlink beamforming weights from the covariance matrices computed at the four adjacent subcarriers.

14. The apparatus of claim 9, wherein when the second wireless device has two antennas, the receiver is configured to receive the training pattern by receiving three consecutive subcarriers of the received training pattern across the plurality of antennas of the first wireless device, and the processor is configured to compute a cyclic shift diversity angle θ from an average$[(r_2*s_2-r_3*s_3)/(r_1*s_1-r_2*s_2)]$, wherein $s_1$, $s_2$ and $s_3$ are known values at three consecutive subcarriers of the training pattern, and $r_1$, $r_2$ and $r_3$ are vectors representing the received values at the three consecutive subcarriers across the plurality of antennas of the first wireless device.

15. The apparatus of claim 9, wherein the training pattern is a high-throughput long training field.

16. The apparatus of claim 9, further comprising a transmitter to transmit the downlink transmission without applying the downlink beamforming weights when the number of spatial streams contained in the uplink signals cannot be accurately estimated.

17. One or more non-transitory, computer readable storage media storing instructions that, when executed by a processor, are operable to:
  derive values at a plurality of subcarriers across a plurality of antennas of a first wireless device from received uplink signals from a second wireless device, wherein the uplink signals from the second wireless device comprise a number of spatial streams less than a number of the plurality of antennas of the second wireless device;
  compute downlink beamforming weights based on values at two or more consecutive subcarriers across the plurality of antennas by computing a covariance matrix at each of the two or more consecutive subcarriers, and computing the downlink beamforming weights by deriving full spatial information for a wireless channel between the first wireless device and the second wireless device when the second wireless device uses a spatial expansion matrix to transmit the number of spatial streams less than the number of the plurality of antennas of the second wireless device;
  estimate cyclic shift diversity performed at the second wireless device by computing an average with respect to the received uplink signals and known values of a training pattern over the plurality of antennas of the first wireless device at the consecutive subcarriers, the estimated cyclic shift diversity used in the computing of the downlink beamforming weights; and
  apply the downlink beamforming weights at respective subcarriers to the number of spatial streams in a downlink transmission to be transmitted to the second wireless device.

18. The computer readable storage media of claim 17, wherein the instructions operable to compute comprise instructions operable to compute the downlink beamforming weights at two consecutive subcarriers based on the values at the two consecutive subcarriers of the uplink signals received at the plurality of antennas.

19. The computer readable storage media of claim 17, wherein the instructions operable to compute comprise instructions operable to compute a covariance matrix at each of three adjacent subcarriers, and compute the downlink beamforming weights from the covariance matrices computed at the three adjacent subcarriers.

20. The computer readable storage media of claim 17, wherein the instructions operable to compute comprise instructions operable to compute the downlink beamforming weights based further on a predetermined cyclic shift diversity amount to represent any cyclic shift diversity performed at the second wireless device.

21. The computer readable storage media of claim 17, further comprising instructions that, when executed by the processor, cause the processor to compute the downlink beamforming weights by computing a covariance matrix at each of four adjacent subcarriers associated with received uplink signals transmitted using a cyclic shift diversity scheme with four antennas, and computing the downlink beamforming weights from the covariance matrices computed at the four adjacent subcarriers.

22. The computer readable storage media of claim 17, wherein when the second wireless device has two antennas, the instructions, when executed by the processor cause the training pattern to be received by receiving three consecutive subcarriers of the received training pattern across the plurality of antennas of the first wireless device, and the instructions further cause the processor to compute a cyclic shift diversity angle θ from an average$[(r_2*s_2-r_3*s_3)/(r_1*s_1-r_2*s_2)]$, wherein $s_1$, $s_2$ and $s_3$ are known values at three consecutive subcarriers of the training pattern, and $r_1$, $r_2$ and $r_3$ are vectors representing the received values at the three consecutive subcarriers across the plurality of antennas of the first wireless device.

23. The computer readable storage media of claim 17, wherein the training pattern is a high-throughput long training field.

24. The computer readable storage media of claim 17, further comprising instructions that, when executed by the processor, cause the processor cause the transmission of the downlink transmission without applying the downlink beamforming weights when the number of spatial streams contained in the uplink signals cannot be accurately estimated.

* * * * *